(12) United States Patent
Merklein et al.

(10) Patent No.: US 8,789,676 B2
(45) Date of Patent: Jul. 29, 2014

(54) EMERGENCY RELEASE MECHANISM FOR AN AUTOMATIC TRANSMISSION

(75) Inventors: Harald Merklein, Wettstetten (DE); Lars Baruth, Hepberg (DE)

(73) Assignee: Audi AG, Ingolstadt (DE)

( * ) Notice: Subject to any disclaimer, the term of this patent is extended or adjusted under 35 U.S.C. 154(b) by 44 days.

(21) Appl. No.: 13/478,778

(22) Filed: May 23, 2012

(65) Prior Publication Data

US 2012/0298473 A1    Nov. 29, 2012

(30) Foreign Application Priority Data

May 26, 2011    (DE) .......................... 10 2011 102 533

(51) Int. Cl.
*F16H 63/34*    (2006.01)
(52) U.S. Cl.
USPC ....................................... 192/219.4; 74/502.6
(58) Field of Classification Search
USPC ................... 192/219.4–219.7, 220.3; 70/245; 477/193, 198
See application file for complete search history.

(56) References Cited

U.S. PATENT DOCUMENTS

| | | | | |
|---|---|---|---|---|
| 2,964,135 | A * | 12/1960 | Sand | 188/69 |
| 4,369,867 | A * | 1/1983 | Lemieux | 192/219.5 |
| 4,576,261 | A * | 3/1986 | Barr | 192/219.5 |
| 5,972,476 | A * | 10/1999 | Field | 428/174 |
| 7,650,978 | B2 * | 1/2010 | Ruhringer et al. | 192/219.6 |
| 7,694,795 | B2 * | 4/2010 | Berger et al. | 192/219.5 |
| 8,240,448 | B2 * | 8/2012 | Hongawara et al. | 192/219.5 |
| 2012/0186937 | A1 * | 7/2012 | Gutierrez Fernandez | 192/220.3 |

FOREIGN PATENT DOCUMENTS

| | | |
|---|---|---|
| DE | 44 22 257 C1 | 11/1995 |
| DE | 10 2008 006 398 A1 | 7/2009 |
| DE | 100 45 953 B4 | 7/2009 |
| DE | 10 2008 043 249 B3 | 1/2010 |
| EP | 1 111 275 B2 | 6/2001 |

* cited by examiner

*Primary Examiner* — David D Le
*Assistant Examiner* — Mark Manley
(74) *Attorney, Agent, or Firm* — Henry M. Feiereisen LLC.

(57) ABSTRACT

An emergency release mechanism for an automatic transmission includes a shift lever adapted to release a parking position when engaged in an operating position. The shift lever has a hooked or tooth-shaped end portion and is moved by a manually-operated tackle which has an end defined by a surface area of increased diameter to establish an undercut for engagement of the end portion of the shift lever during disengagement of the parking position.

18 Claims, 4 Drawing Sheets

EMERGENCY RELEASE MECHANISM FOR AN AUTOMATIC TRANSMISSION

CROSS-REFERENCES TO RELATED APPLICATIONS

This application claims the priority of German Patent Application, Serial No. 10 2011 102 533.6, filed May 26, 2011, pursuant to 35 U.S.C. 119(a)-(d), the content of which is incorporated herein by reference in its entirety as if fully set forth herein.

BACKGROUND OF THE INVENTION

The present invention relates to an emergency release mechanism for an automatic transmission.

The following discussion of related art is provided to assist the reader in understanding the advantages of the invention, and is not to be construed as an admission that this related art is prior art to this invention.

Automatic transmissions for motor vehicles have a shifting device to select various manually preselectable operating positions, also called driving positions. The term "driving position" relates to all positions of an automatic transmission, including parking position and neutral position. The shifting device includes an operating position selector which can be moved into several positions, each of which being assigned to an operating position. Once selected by the driver, a driving or operating position is engaged by electro-hydraulic setting elements that are operated by a transmission control device.

Shift into the parking position in an automatic transmission blocks the transmission so that the vehicle cannot be towed when the shifting device becomes defective for example. For that reason, automatic transmissions are equipped with an emergency release which normally involves a manually actuatable tackle, e.g. a Bowden cable, to be able to move a shift lever and thereby disengage the parking position by hand in the event of an emergency.

It would be desirable and advantageous to provide an improved emergency release mechanism which obviates prior art shortcomings and which is simple in structure and thus cost-efficient while yet being reliable in operation and easy to install.

SUMMARY OF THE INVENTION

According to one aspect of the present invention, an emergency release mechanism for an automatic transmission includes a shift lever adapted to release a parking position when engaged in an operating position, the shift lever having a hooked or tooth-shaped end portion, and a manually-operated tackle for moving the shift lever, with the tackle having an end defined by a surface area of increased diameter to establish an undercut for engagement of the end portion of the shift lever during disengagement of the parking position.

An emergency release mechanism according to the present invention includes components of simple structure which can be manufactured inexpensively and are easy to install. The provision of a hook-shaped or tooth-shaped end portion of the shift lever ensures a form-fitting contact between the shift lever and the end of the tackle during emergency release in order to reliably pivot the shift lever by the tackle and thereby disengage the parking position. The end of the tackle is hereby configured with a surface area of increased diameter to form an undercut for engagement by the end portion of the shift lever, when effecting the disengagement. This increased surface area is easy to make and easy to install.

According to another advantageous feature of the present invention, the surface area of increased diameter may have a radially symmetric configuration. This optimizes installation because there is no need to mount the tackle in a particular angular position as the radially symmetrical end of the tackle enables a pivoting of the shift lever in all driving positions.

According to another advantageous feature of the present invention, the surface area can have, at least in part, a plate-shaped configuration with an edge which is angled substantially at a right angle. Advantageously, the free end of the angled edge points to the hook-shaped or tooth-shaped end portion of the shift lever so that the edge of the surface area of increased diameter is able to engage the undercut to establish the required formfit between tackle and shift lever.

As an alternative to the plate-shaped configuration, the surface area can be configured such that according to another advantageous feature of the present invention, its shift-lever-proximal side is formed, at least in part, concave-spherically or concave-conically. Regardless of its configuration, the surface area can be made cost-effectively and is capable to reliably ensure a formfit between tackle and shift lever in order to disengage the parking position.

According to another advantageous feature of the present invention, the shift lever and the tackle touch one another only during disengagement of the parking position but otherwise are separated from one another. When the shift lever and the tackle are not in contact with one another, the presence of a structure-borne sound bridge is prevented. The shift lever can be pivoted between a locked position and an unlocked position without contacting the tackle or its end. The tackle may be maintained under a spring tension so as to be able to spontaneously return to its initial position after actuation.

According to another advantageous feature of the present invention, the shift lever may be configured as a punched part. The hook-shaped or tooth-shaped end portion of the shift lever may be produced by a simple punching process in the absence of any further manufacturing steps.

According to another advantageous feature of the present invention, the shift lever may have a clearance in addition to the hooked or tooth-shaped end portion. This clearance enables the hook-shaped or tooth-shaped end portion to remain in close proximity to the surface area of increased diameter at the end of the tackle during normal operation and may even permit the hook-shaped or tooth-shaped end portion to enter the volume demarcated by the surface area with the angled edge while still preventing any contact between the shift lever and the end of the tackle during operation.

According to another advantageous feature of the present invention, the surface area of increased diameter is formed in one piece with the end of the tackle. This contributes further to a simple manufacture of the emergency release mechanism. Advantageously, the surface area of increased diameter can be connected to the end of the tackle by bolts, rivets, or by welding or by crimping.

According to another aspect of the present invention, a motor vehicle includes an automatic transmission having an emergency release mechanism which includes a shift lever adapted to release a parking position when engaged in an operating position, with the shift lever having a hooked or tooth-shaped end portion, and a manually-operated tackle for moving the shift lever, with the tackle having an end defined by a surface area of increased diameter to establish an undercut for engagement of the end portion of the shift lever during disengagement of the parking position.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
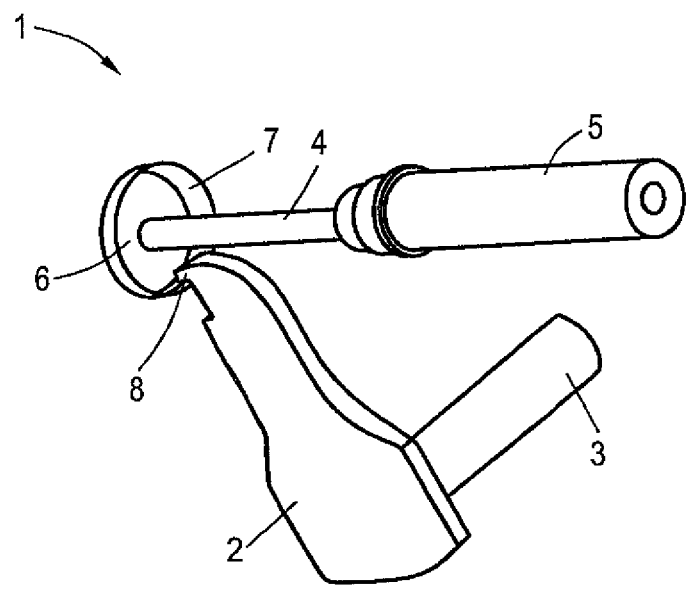
FIG. 1 is a perspective illustration of an emergency release mechanism according to the present invention for use in a shifting device for an automatic transmission.
Figure 2:
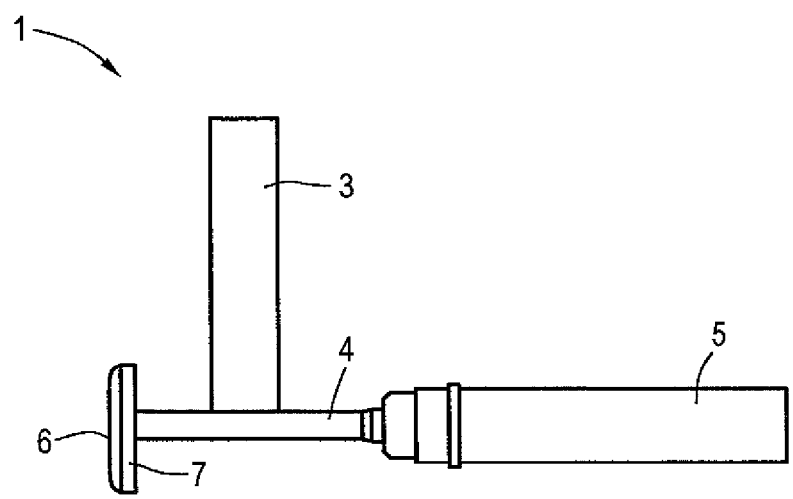
FIG. 2 is a top view of the emergency release mechanism.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of an emergency release mechanism according to the present invention, generally designated by reference numeral 1, for use in a shifting device for an automatic transmission. The emergency release mechanism 1 includes a shift lever 2 which is configured as a flat punched part and has a shaft 3 which defines a rotation axis of the shift lever 2. The shaft 3 connects the shift lever 2 with electro-hydraulic setting elements of the automatic transmission. Turning the shift lever 2 about its rotation axis causes a release of the engaged parking position. This manual disengagement of the parking position is executed only in the event the shifting device is not operational so as to allow the vehicle to be towed.

The emergency release mechanism 1 includes a tackle 4 of which FIG. 1 shows only the end portion. A user applies a pulling force on the opposite end so as to pivot the shift lever 3. The tackle 4 is guided in an envelope 5. At its end, the tackle 4 has a surface area 6 of increased diameter which has a radially symmetrical configuration. In the non-limiting example as illustrated in the drawings, the surface area 6 has a substantially plate-shaped configuration and includes an edge 7 which is angled substantially at a right angle. The edge 7 is thus arranged in parallel relationship to an actuator of the tackle 4. The radially symmetrical shape of the surface area 6 simplifies installation of the tackle 4 because there is no need to adjust a particular angular disposition between tackle 4 and shift lever 2.

The shift lever 2 has a hook-shaped or tooth-shaped end portion 8 which points towards the end of the tackle 4. The end portion 8 ensures the presence of only a point contact connection between the shift lever 2 and the tackle 4.

Figure 3:
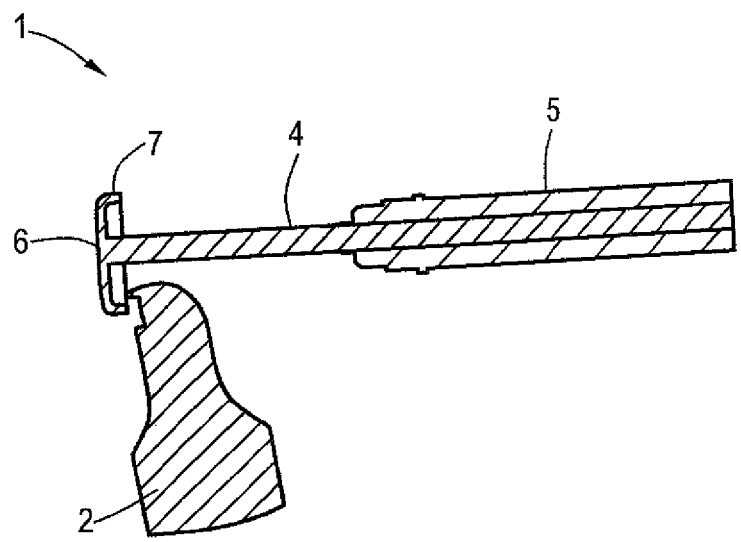
FIG. 3 is a sectional side view of the emergency release mechanism.
Figure 4:
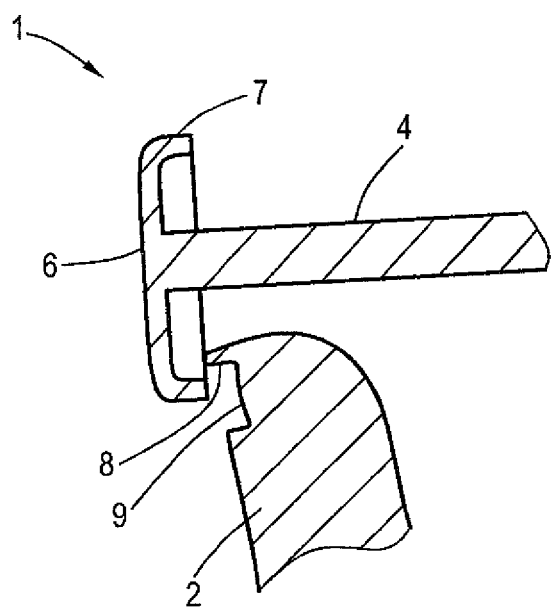
FIG. 4 is a detailed view, on an enlarged scale, of the emergency release mechanism of FIG. 3.

FIGS. 3 and 4 show a sectional side view of the emergency release mechanism 1, with FIG. 4 depicting the end portion of the tackle 4 on an enlarged scale. FIGS. 3 and 4 show the emergency release mechanism 1 in the normal state, i.e. when idle and not actuated. In this state, the shift lever 2 does not touch the tackle 4 or its enlarged surface area 6. Therefore, there is no conduction of a structure-borne noise as caused by the automatic transmission via the shift lever 2 to the tackle 4. As further shown in particular in FIG. 4, the shift lever 2 has a clearance 9 immediately adjacent to or beneath the end portion 8 to ensure that the surface area 6 of increased diameter at the end of the tackle 4 is prevented from touching the shift lever 2. The distance between the end portion 8 of the shift lever 2 and the surface area 6 of the tackle 4 is slight to establish an actuation path that is small and yet sufficient to allow a pivoting of the shift lever 2 when operating the tackle 4 by hand.

Figure 5:
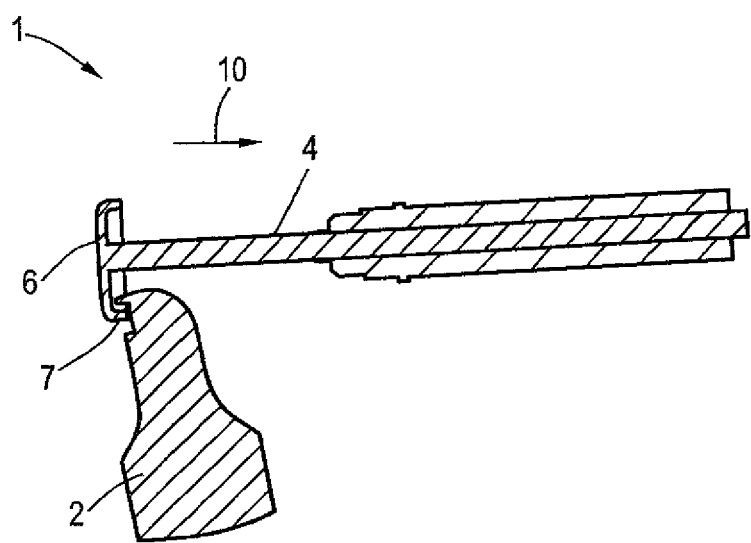
FIG. 5 is a sectional side view of the emergency release mechanism, when actuated.
Figure 6:
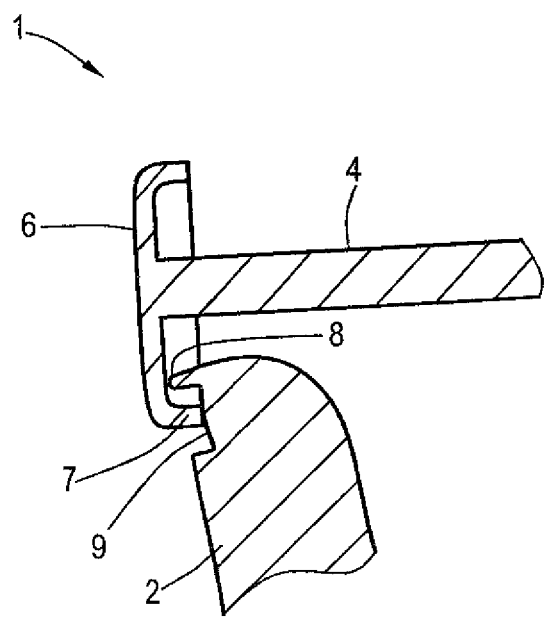
FIG. 6 is a detailed view, on an enlarged scale, of the emergency release mechanism of FIG. 5.

FIGS. 5 and 6 show a sectional side view of the emergency release mechanism 1 during actuation, with FIG. 6 depicting the contact zone between the shift lever 2 and the tackle 4 on an enlarged scale. When actuating the emergency release mechanism 1, the tackle 4 is pulled in a direction as indicated by arrow 10. As can be seen from FIG. 6, the edge 7 of the enlarged surface area 6 at the end of the tackle 4 touches the shift lever 2 in the area of the clearance 9 so that the shift lever 2 is pivoted in clockwise direction about its rotation axis.

Of course, other configurations of the end portion 8 of the shift lever 2 are possible. For example, the hook-shaped or tooth-shaped end portion 8 may project further out so that the end portion 8 touches the surface area 6. A slight rotation of the shift lever 2 is sufficient to release the engaged parking position and thus to allow the vehicle to be towed.

Figure 7:
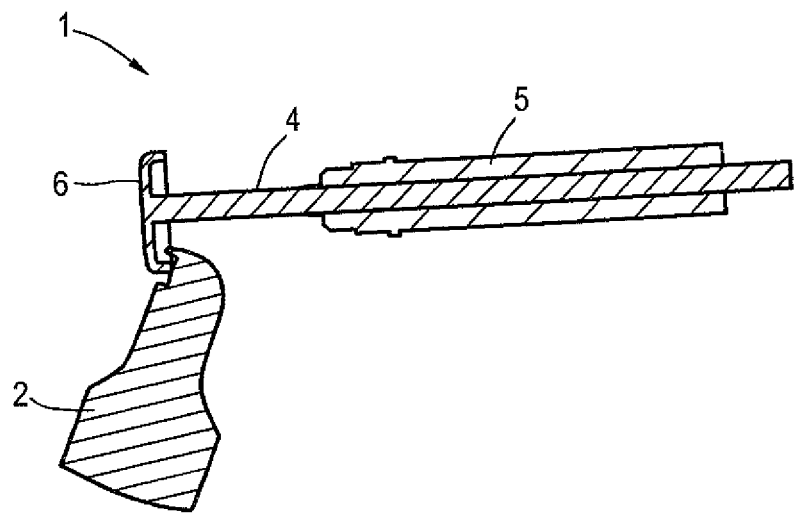
FIG. 7 is a sectional side view of the emergency release mechanism during disengagement of the parking position.

FIG. 7 shows the emergency release mechanism 1 in disengaged state. The shift lever 2 has been turned clockwise from the position shown in FIG. 5 to effect a disengagement of the parking position. After being released, the spring-biased tackle 4 is returned by the influence of the spring to the idle position shown in FIG. 5. The short projection of the tackle 4 out of the envelope 5 ensures a precise positioning of the end of the tackle 4 with the surface area 6 and a precise guidance of the tackle 4 in the envelope 5.

Figure 8:
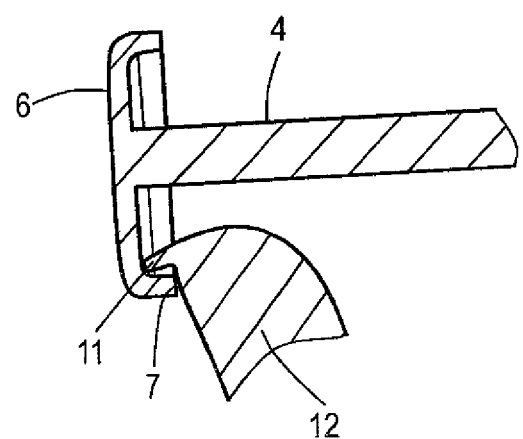
FIG. 8 is a detailed view of a variation of an emergency release mechanism according to the present invention.

FIG. 8 shows is a detailed view of a variation of an emergency release mechanism according to the present invention. Parts corresponding with those in FIG. 1 are denoted by identical reference numerals and not explained again. The description below will center on the differences between the embodiments. In this embodiment, provision is made for a shift lever 12 having a base body terminating in an end portion 11 of hook-shaped configuration. Compared to the shift lever 2 of the preceding embodiments, the end portion 11 of the shift lever 12 projects further out from the base body so that the need for a clearance is eliminated. As shown in FIG. 8, the end portion 11 of the shift lever 12 touches the inside of the enlarged surface area 6 of the tackle 4 and the edge 7 of the surface area 6 touches the shift lever 12 next to the end portion 11. This ensures the necessary force flux.

Of course, the emergency release mechanism can also be modified in such a way that the end portion 11 projects further out from the base body of the shift lever 12 so that contact is established only between the end portion 11 and the inside of the surface area 6 when a user operates the emergency release by hand.

As also shown in FIG. 8, the surface area 6 with the edge 7 is compressed or crimped in one piece with the end of the tackle 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An emergency release mechanism for an automatic transmission, comprising:
    a shift lever adapted to release a parking position when engaged in an operating position, said shift lever having a hooked or tooth-shaped end portion extending transversely to its remaining portion only on one side of said shift lever, said shift lever being turnable about its axis of rotation; and
    a manually operated elongated tackle for turning the shift lever, said tackle having one end of increased diameter, said one end being configured to bound an interior space into which the hook-shaped or tooth-shaped end portion of the shift lever projects during disengagement of the parking position.

2. The emergency release mechanism of claim 1, wherein the end of increased diameter has a radially symmetric configuration.

3. The emergency release mechanism of claim 1, wherein the end has, at least in part an edge which is angled substantially at a right angle.

4. The emergency release mechanism of claim 1, wherein the end has a shift-lever-proximal side which is formed, at least in part, concave-spherically or concave-conically to define the interior space.

5. The emergency release mechanism of claim 1, wherein the shift lever and the tackle touch one another only during disengagement of the parking position but otherwise are disengaged.

6. The emergency release mechanism of claim 1, wherein the shift lever is a substantially flat structure produced through punching or laser cutting.

7. The emergency release mechanism of claim 1, wherein the shift lever has a clearance in addition to the hooked or tooth-shaped end portion.

8. The emergency release mechanism of claim 1, wherein the end of the tackle is formed in one piece.

9. The emergency release mechanism of claim 1, wherein the end of the tackle is made of multiple parts connected to one another by a member selected from the group of bolts, rivets, welding process, and crimping process.

10. A motor vehicle, comprising and automatic transmission having an emergency release mechanism, said emergency release mechanism comprising a shift lever adapted to release a parking position when engaged in an operating position, said shift lever having a hooked or tooth-shaped end portion extending transversely to its remaining portion only on one side of said shift lever, said shift lever being turnable about is axis of rotation; and a manually operated elongated tackle for turning the shift lever, said tackle having one end of increased diameter, said one end being configured to bound an interior space into which the hook-shaped or tooth-shaped end portion of the shift lever projects during disengagement of the parking position.

11. The motor vehicle of claim 10, wherein the end of increased diameter has a radially symmetric configuration.

12. The motor vehicle of claim 10, wherein the end has, at least in part an edge which is angled substantially at a right angle.

13. The motor vehicle of claim 10, wherein the end has a shift-lever-proximal side which is formed, at least in part, concave-spherically or concave-conically to define the interior space.

14. The motor vehicle of claim 10, wherein the shift lever and the tackle touch one another only during disengagement of the parking position but otherwise are disengaged.

15. The motor vehicle of claim 10, wherein the shift lever is a substantially flat structure produced through punching or laser cutting.

16. The motor vehicle of claim 10, wherein the shift lever has a clearance in addition to the hooked or tooth-shaped end portion.

17. The motor vehicle of claim 10, wherein the end of the tackle is formed in one piece.

18. The motor vehicle of claim 10, wherein the end of the tackle is made of multiple parts connected to one another by a member selected from the group of bolts, rivets, welding process, and crimping process.

* * * * *